`US010467820B2`

United States Patent
Mordvintsev et al.

(10) Patent No.: US 10,467,820 B2
(45) Date of Patent: Nov. 5, 2019

(54) IMAGE STYLE TRANSFER FOR THREE-DIMENSIONAL MODELS

(71) Applicant: Google LLC, Mountain View, CA (US)

(72) Inventors: Alexander Mordvintsev, Langnau am Albis (CH); Matthew Sharifi, Klichberg (CH)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 15/878,621

(22) Filed: Jan. 24, 2018

(65) Prior Publication Data

US 2019/0228587 A1    Jul. 25, 2019

(51) Int. Cl.
| | |
|---|---|
| *G06T 19/20* | (2011.01) |
| *G06T 15/04* | (2011.01) |
| *G06K 9/62* | (2006.01) |
| *G06T 15/20* | (2011.01) |

(52) U.S. Cl.
CPC ............ *G06T 19/20* (2013.01); *G06K 9/6212* (2013.01); *G06T 15/04* (2013.01); *G06T 15/205* (2013.01); *G06T 2219/2012* (2013.01); *G06T 2219/2024* (2013.01)

(58) Field of Classification Search
CPC ....... G06T 19/20; G06T 15/04; G06T 15/205; G06T 2219/2012; G06T 2219/2024; G06K 9/6212
See application file for complete search history.

(56) References Cited

U.S. PATENT DOCUMENTS

| | | | |
|---|---|---|---|
| 2011/0058609 A1* | 3/2011 | Chaudhury | ............ H04N 19/23 375/240.16 |
| 2018/0068463 A1* | 3/2018 | Risser | ....................... G06T 7/45 |
| 2018/0204336 A1* | 7/2018 | Fang | ..................... G06T 11/001 |
| 2018/0373999 A1* | 12/2018 | Xu | ..................... G06K 9/00765 |

OTHER PUBLICATIONS

Kato, Neural 3D Mesh Renderer, arXiv preprint arXiv:1711.07566, 2017 (Year: 2017).*

(Continued)

*Primary Examiner* — Mark K Zimmerman
*Assistant Examiner* — Phuc N Doan
(74) *Attorney, Agent, or Firm* — Dority & Manning, P.A.

(57) ABSTRACT

Example aspects of the present disclosure are directed to systems and methods that perform image style transfer for three-dimensional models. In some implementations, the systems and methods can use machine-learned models such as, for example, convolutional neural networks to generate image style and content information used to perform style transfer. The systems and methods of the present disclosure can operate in a rendered image space. In particular, a computing system can iteratively modify an attribute rendering map (e.g., texture map, bump map, etc.) based on information collected from a different rendering of the model at each of a plurality of iterations, with the end result being that the attribute rendering map mimics the style of one or more reference images in content-preserving way. In some implementations, a computation of style loss at each iteration can be performed using multi-viewpoint averaged scene statistics, instead of treating each viewpoint independently.

20 Claims, 10 Drawing Sheets
(2 of 10 Drawing Sheet(s) Filed in Color)

(56) References Cited

OTHER PUBLICATIONS

Jing, Neural Style Transfer: A Review, arXiv:1705.04058v7, 2018 (Year: 2018).*
Ha, Neural Network Generative Art in Javascript ,2015, URL: blog.otoro.net/2015/06/19/neural-network-generative-art/ (Year: 2015).*
Mordvintsev et al., Differentiable Image Parameterizations, URL: https://distill.pub/2018/differentiable-parameterizations/#section-style-transfer-3d , DOI 10.23915/distill.00012 (Year: 2018).*
Lun, Functionality Preserving Shape Style Transfer—ACM SA '16 Technical Papers, Dec. 5-8, 2016, (Year: 2016).*
Cadzow, Image Texture Synthesis-by-Analysis Using Moving-Average Models—IEEE Transactions on Aerospace and Electronic Systems vol. 29, pp. 1110-1122 (Year: 1993).*
Narayanan, Convolutional_neural_networks_for_artistic_style_transfer, Mar. 2017, URL: https://harishnarayanan.org/writing/artistic-style-transfer/ (Year: 2017).*
Athalye et al., "Synthesizing Robust Adversarial Examples", arXiv:1707.07397v2, Oct. 30, 2017, 18 pages.
Fiser et al., "StyLit: Illumination-Guided Example-Based Stylization of 3D Renderings", Association for Computing Machinery on Graphics, vol. 35, No. 4, New York, New York, Jul. 2016, 11 pages.
Gatys et al., "A Neural Algorithm of Artistic Style", arXiv:1508.06576v2, Sep. 2, 2015, 16 pages.
Kato et al., "Neural 3D Mesh Renderer", arXiv:1711.07566v1, Nov. 20, 2017, 17 pages.
Li et al., "Combining Markov Random Fields and Convolutional Neural Networks for Image Synthesis", Proceedings of the Institute of electrical and Electronics Engineers Conference on Computer Vision and Pattern Recognition, Seattle, Washington, Jun. 27-30, 2016, pp. 2479-2486.
Li et al., "Demystifying Neural Style Transfer", Proceedings of the Twenty-Sixth International Joint Conference on Artificial intelligence, Melbourne, Australia, Aug. 19-25, 2017, pp. 2230-2236.
Luan et al., "Deep Photo Style Transfer", arXiv:1703.07511v3, Apr. 11, 2017, 9 pages.
Olah et al., "Feature Visualization", Distill, Nov. 7. 2017, https://distill.pub/2017/feature-visualization/, retrieved on Jan. 19, 2018, 29 pages.
Risser et al., "Stable and Controllable Neural Texture Synthesis and Style Transfer Using Histogram Losses", arXiv:1701.08893v2, Feb. 1, 2017, 14 pages.
Ruder et al., "Artistic Style Transfer for Videos", arXiv:1604.08610v2, Oct. 19, 2016, 14 pages.
StyLit, "StyLit Demo", 2016, https://stylit.org, retrieved on Jan. 23. 2018, 3 pages.

* cited by examiner

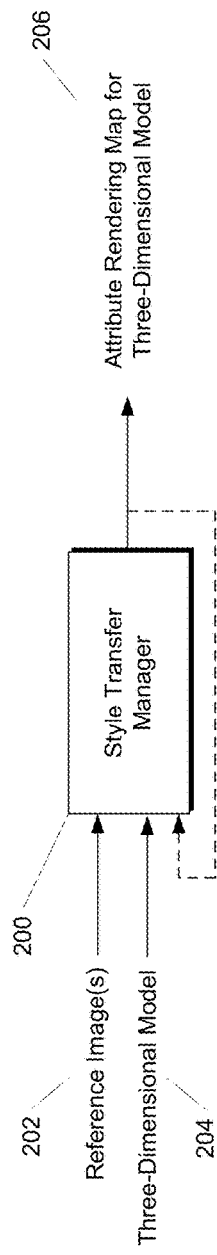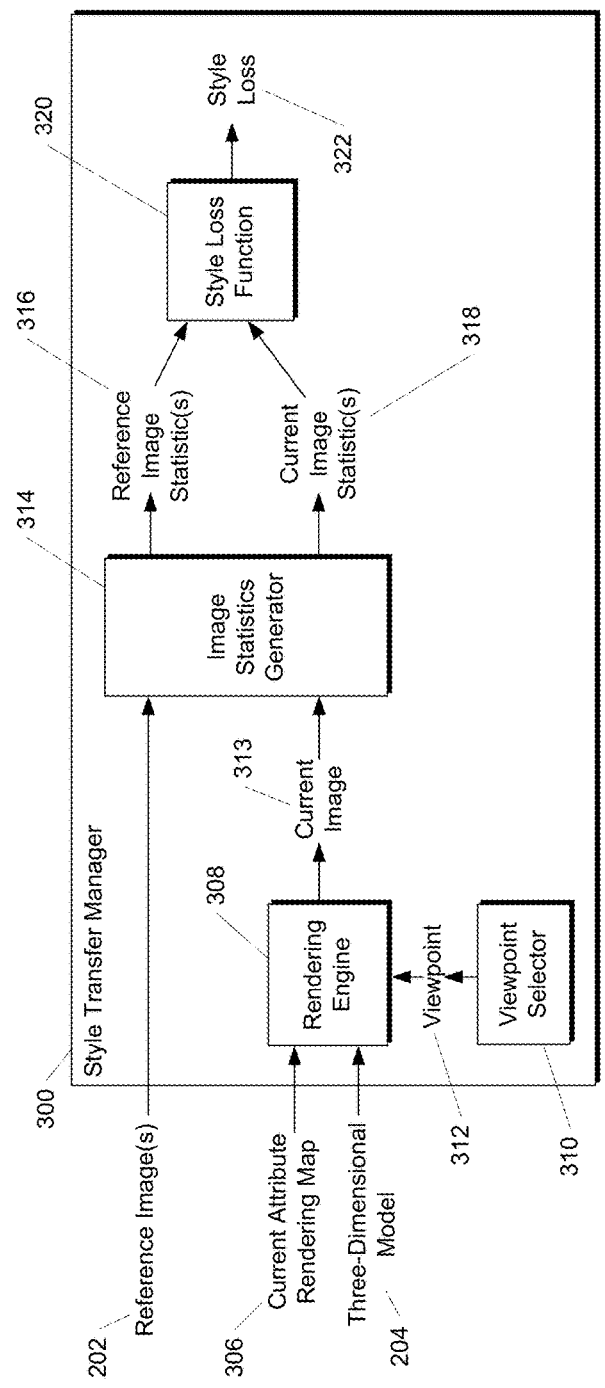

IMAGE STYLE TRANSFER FOR THREE-DIMENSIONAL MODELS

FIELD

The present disclosure relates generally to image style transfer for three-dimensional models. More particularly, the present disclosure relates to image style transfer for three-dimensional models through, for example, the use of machine-learned models such as, for example, convolutional neural networks.

BACKGROUND

Style transfer can generally refer to the concept and process or applying the look and feel from a set of reference imagery to a base image, thereby creating a new version of the base image that has or otherwise exhibits the look and feel of the first set of imagery.

More particularly, various computing systems and methods exist that allow a user to select one or more reference images that are representative of a desired look and feel (i.e., a desired style). For example, the look and feel can include color schemes, lighting schemes, and/or other attributes of the imagery that contribute to its style. These computing systems and methods can apply the look and feel to a base image, thereby creating a new version of the base image that has the desired look and feel.

However, while these existing systems provide state-of-the-art results for two-dimensional imagery, to date there has not been a workable system for performing image style transfer for three-dimensional models such as, for example, three-dimensional mesh models. The fact that only two-dimensional images are supported limits the set of applications of the style transfer technique.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by one or more computing devices, one or more references images and data descriptive of a three-dimensional model. The method includes determining, by the one or more computing devices, one or more reference image statistics for the one or more reference images. The method includes, for each of a plurality of iterations, rendering, by the one or more computing devices, a current image of the three-dimensional model from a current viewpoint using a current attribute rendering map. The current attribute rendering map provides a plurality of attribute values respectively for a plurality of locations of the three-dimensional model. The method includes, for each of the plurality of iterations, determining, by the one or more computing devices, one or more current image statistics for the current image of the three-dimensional model rendered from the current viewpoint using the current attribute rendering map. The method includes, for each of the plurality of iterations, updating, by the one or more computing devices, one or more average image statistics based at least in part on the one or more current image statistics determined for the current image. The method includes, for each of the plurality of iterations, evaluating, by the one or more computing devices, a loss function that evaluates a difference between the one or more reference image statistics and the one or more average image statistics. The method includes, for each of the plurality of iterations, modifying, by the one or more computing devices, the current attribute rendering map based at least in part on a gradient of the loss function.

Another example aspect of the present disclosure is directed to a computing system. The computing system includes one or more processors and one or more non-transitory computer-readable media that collectively store instructions that when executed by the one or more processors cause the computing system to perform operations. The operations include determining one or more reference image statistics for one or more reference images. The operations include, for each of a plurality of iterations, obtaining a current image of a three-dimensional model rendered from a current viewpoint using a current attribute rendering map. The operations include, for each of the plurality of iterations, determining one or more current image statistics for the current image of the three-dimensional model rendered from the current viewpoint using the current attribute rendering map. The operations include, for each of the plurality of iterations, evaluating a loss function that provides a loss value based at least in part on the one or more reference image statistics and based at least in part on the one or more current image statistics. The operations include, for each of the plurality of iterations, modifying, based at least in part on a gradient of the loss function, one or more of: the current attribute rendering map; one or more parameters of a map generation function configured to generate the current attribute rendering map; or one or more parameters of a rendering function configured to render the current image.

Another example aspect of the present disclosure is directed to one or more non-transitory computer-readable media that collectively store instructions that when executed by one or more processors cause the one or more processors to perform operations. The operations include determining one or more reference image statistics for one or more reference images. The operations include, for each of a plurality of iterations, obtaining a current image of a three-dimensional model rendered from a current viewpoint using a current attribute rendering map. The operations include, for each of the plurality of iterations, determining one or more current image statistics for the current image of the three-dimensional model rendered from the current viewpoint using the current attribute rendering map. The operations include, for each of the plurality of iterations, evaluating a loss function that provides a loss value based at least in part on the one or more reference image statistics and based at least in part on the one or more current image statistics. The operations include, for each of the plurality of iterations, modifying, based at least in part on a gradient of the loss function, one or more of: the current attribute rendering map; one or more parameters of a map generation function configured to generate the current attribute rendering map; or one or more parameters of a rendering function configured to render the current image.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

Detailed discussion of embodiments directed to one of ordinary skill in the art is set forth in the specification, which makes reference to the appended figures, in which:

FIG. 2 depicts a block diagram of an example style transfer manager according to example embodiments of the present disclosure.

FIG. 3 depicts a block diagram of an example style transfer manager according to example embodiments of the present disclosure.

Figure 1A:
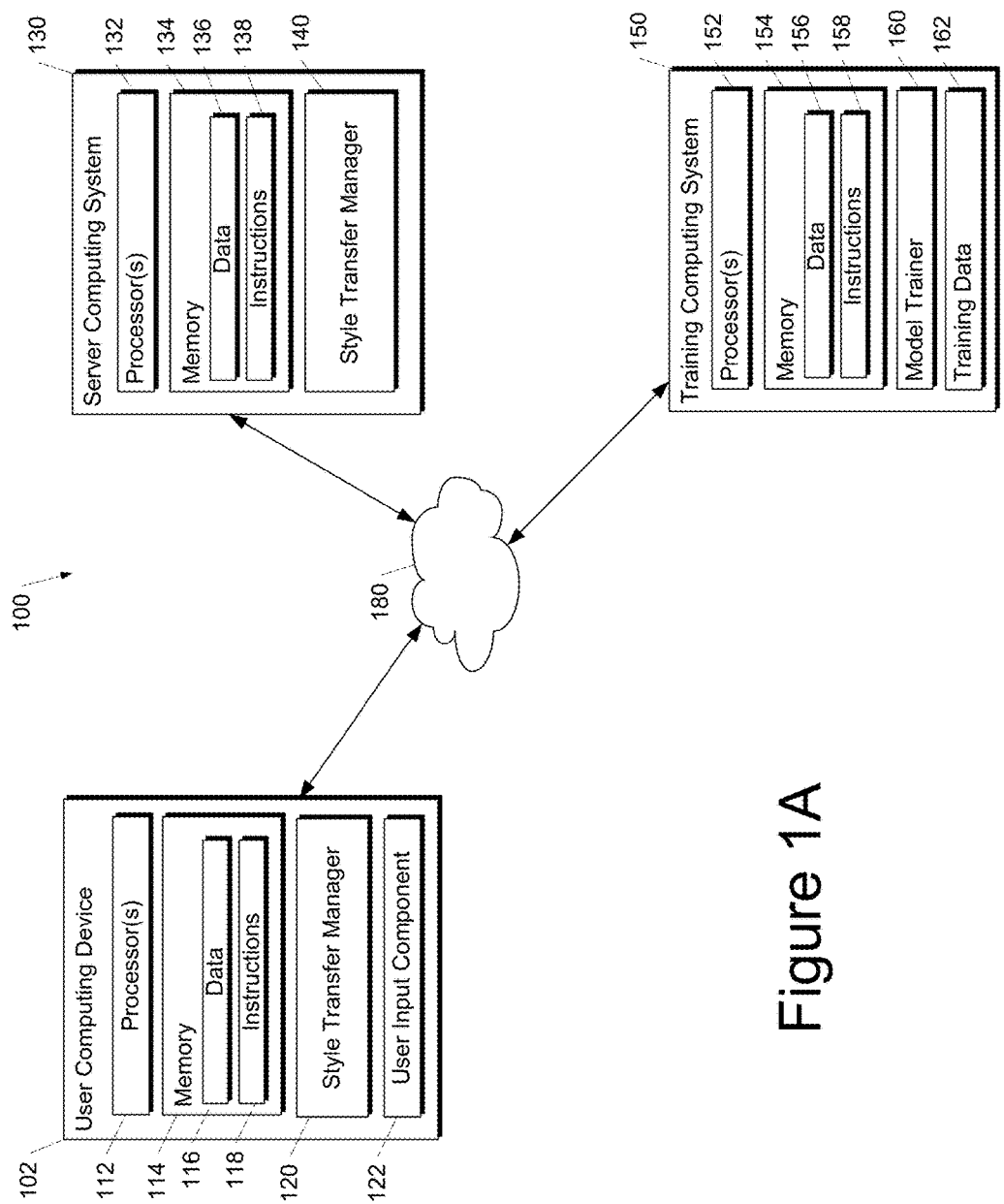
FIG. 1A depicts a block diagram of an example computing system that performs style transfer for three-dimensional models according to example embodiments of the present disclosure.

Reference numerals that are repeated across plural figures are intended to identify the same features in various implementations.

DETAILED DESCRIPTION

Overview

Example aspects of the present disclosure are directed to systems and methods that perform image style transfer for three-dimensional models. More particularly, in some implementations, the systems and methods of the present disclosure can use machine-learned models such as, for example, convolutional neural networks to generate image style and content information which may then be used to perform style transfer. According to one aspect of the present disclosure, the systems and methods of the present disclosure can operate in a rendered image space. In particular, a computing system can iteratively modify an attribute rendering map (e.g., texture map, bump map, etc.) based on information collected from a different rendering of the model at each of a plurality of iterations, with the end result being that the attribute rendering map mimics the style of one or more reference images in a content-preserving way. According to another aspect of the present disclosure, in some implementations, a computation of style loss at each iteration can be performed using multi-viewpoint averaged scene statistics, instead of treating each viewpoint independently. Furthermore, a gradient of the loss function can be backpropagated through the rendering operation to modify the attribute rendering map itself. Thus, the systems and methods of the present disclosure can perform style transfer and provide consistent attribute rendering maps for three-dimensional models, including models that have non-uniform and/or fragmented UV-mappings.

More particularly, in some implementations, a computing system can take as input one or more reference images and an arbitrary (possibly textured) three-dimensional model (e.g., mesh model). The one or more reference images can be representative of a desired style. The computing system can iteratively synthesize a new attribute rendering map that provides one or more attribute values used when rendering the three-dimensional model. In particular, the new attribute rendering map can match the desired style provided by the one or more reference images.

More generally, an attribute rendering map can provide a plurality of attribute values respectively for a plurality of locations of the three-dimensional model. For example, the attribute values provided by the attribute rendering map can be mapped to the three-dimensional model by way of UV mapping. The attribute values can be values for any attribute of the model used when rendering the model.

As one example, the attribute rendering map can be a texture map. The texture map can provide texture values for each location of the three-dimensional model. For example, the texture values can include color values such as RGB values, RGBA values, CMYK values, HSV values, HSL values, etc. One example form of a texture map is a texture atlas.

As other examples, the attribute rendering map can be a bump map that provides surface normal information for each location of the three-dimensional model. Example bump maps include normal maps, displacement maps, or other forms of bump maps. As yet further examples, the attribute rendering map can be a light color map that provides light color information for rendered locations; a light position map that provides light position information for rendered locations; a material property map that provides material property information (e.g., reflectiveness, hardness, acoustic properties, flexibility, roughness, luminosity, absorbance, etc.) for locations of the three-dimensional model; and/or other forms of attribute rendering maps. Generally, the attribute rendering map can provide attribute values for any attribute of the model used when rendering the model.

As indicated above, the computing system can iteratively synthesize a new attribute rendering map for one or more attributes of the three-dimensional model based on one or more reference images. To do so, the computing system can iteratively modify the attribute rendering map based on information collected from a different rendering of the model at each of a plurality of iterations, with the end result being that the attribute rendering map mimics the style of one or more reference images in a content-preserving way.

As one example, at each iteration, a computing system can sample a different viewpoint of the model. For example, the computing system can select (for instance, randomly) a viewpoint from a set of expected viewpoints. The set of expected viewpoints can include all available viewpoints or can be limited to viewpoints from which the model is capable of being rendered or otherwise expected to be rendered during use of the model.

At each iteration/viewpoint, the computing system can render a current image of the model from the sampled viewpoint using a current version of the attribute rendering map. In some implementations, the computing system can determine a style loss between respective image (or feature) statistics of the current image and the reference image(s) and/or a content loss between respective content descriptors for the current image and a rendering of the model from the same viewpoint using a base attribute rendering map. The computing system can update the attribute rendering map based on the style loss and/or the content loss.

More particularly, in some implementations, the computing system can determine a style loss between respective image statistics of the current image and the reference image(s). Thus, in some implementations, the computing system can determine, optionally prior to beginning the iterative process, one or more image statistics for the reference image(s). The one or more image statistics can be any form of image analysis that provides information that describes the style of the image. The image (or feature) statistics of a particular image may carry the style (or look and feel) information of that image. However, depending on the image/feature statistics used, they might not capture the semantic structures of the image.

As one example, the one or more image statistics can include histograms (e.g., color histograms); edge information; contrast; spatial frequency (e.g., high-frequency maps); average pixel values; maximum/minimum pixel values; median values and/or variance of individual feature channels; feature matching; Markovian texture analysis; Markov Random Fields; etc.

According to another aspect of the present disclosure, in some implementations, the computing system can leverage one or more machine-learned models such as, for example, convolutional neural networks, to generate style information. In particular, in some implementations, the computing system can use one or more convolutional neural networks to generate the image statistics for the current image and/or reference image(s).

As one example, to determine the image statistics for an image (e.g., a current image and/or a reference image), the computing system can input the image into the convolutional neural network and, in response, receive an output from the convolutional neural network. In some implementations, the output of the convolutional neural network can be used as the image statistics for the input image. In other implementations, one or more values obtained from hidden layers or neurons of the neural network (e.g., an "embedding") can be used as the image statistics or as a basis for generating the image statistics. As one example, the computing system can determine the one or more image statistics for the input image based at least in part on one or more Gram or covariance matrices computed over internal features (e.g., hidden neurons) of the convolutional neural network.

The convolutional neural network can be specifically trained to provide the one or more image statistics. Alternatively, the convolutional neural network can be a general network pre-trained to perform some generic form of image analysis (e.g., image classification, image recognition, object recognition, object segmentation, etc.). Example convolutional neural networks include the VGG16, VGG19, ResNet50, Inception V3, and Xception networks.

Further, the computing system can leverage other machine-learned models or networks in addition or alternatively to convolutional neural networks to generate the image statistics. Example neural networks (e.g., deep neural networks) include feed-forward neural networks, recurrent neural networks, etc. Additional example models that can be used to generate the image statistics include linear models; principal component analysis models; clustering models (e.g., K-nearest-neighbor); probabilistic models; Markov random fields; regression models; etc.

Thus, the computing system can determine, optionally prior to beginning the iterative process, one or more image statistics for the reference image(s). Then, at each iteration, the computing system can render a current image of the model from a different viewpoint and assess the same one or more image statistics for the current image. At each iteration, the computing system can evaluate a style loss that provides a loss value based at least in part on the one or more reference image statistics determined for the reference image(s) and the one or more current image statistics determined for the current image. Thus, the style loss value indicates, at each iteration, how similar the style of the current image is to the style exhibited by the reference image(s). As will be described further below, the current attribute rendering map can be updated at each iteration based at least in part on the style loss value (e.g., to reduce the style loss value such that the renderings of the model become more similar to the style exhibited by the reference image(s)).

According to yet another aspect of the present disclosure, in some implementations, the computation of the style loss can be performed using multi-viewpoint averaged image statistics, instead of treating each viewpoint independently. For example, at each iteration, a running average of image statistics across multiple viewpoint renderings can be updated with the current image statistics determined for the current image. The loss function can provide the style loss value based on a difference between the average image statistics and the reference image statistics determined for the reference image(s).

By computing the average of the image statistics over multiple viewpoints and then computing the style loss using the multi-viewpoint averaged image statistics, the computing system can provide more globally consistent style transfer results. In particular, style transfer for three-dimensional models provides significant additional challenges that extend beyond the traditional two-dimensional problem. As one example, three-dimensional models can include non-uniform and/or fragmented UV-mapping. As another example three-dimensional models can have a number of locations that are visible in only a small percentage of all available viewpoints (e.g., crevices, nooks, etc.). By using the average of the image statistics over multiple viewpoints, style information is passed across multiple viewpoints, enabling these challenging locations to be stylized based on information from multiple viewpoints and leading to more globally consistent results.

In some implementations, in addition or alternatively to the use of a style loss at each iteration, the computing system can determine a content loss between respective content descriptors for the current image and a rendering of the model from the same viewpoint using a base attribute rendering map. In particular, in some implementations, at each iteration, the computing system can render two images from the selected viewpoint: a current image using the current attribute rendering map that is being iteratively updated and a base image using a base attribute rendering map. The base attribute rendering map can be an attribute rendering map associated with an original or base version of the model. As one example, the base attribute rendering map can be a base texture map.

The base attribute map can include attribute values that assist in conveying content information. To provide one particular example, a model of a zebra might have a base texture map that includes texture values that contribute to renderings of the model being recognizable as a zebra. For example, the texture map might provide textures that include stripes.

At each iteration, the computing system can determine one or more content descriptors for each of the current image and the base image. The content descriptors for each image can include any information that describes the content of the image and, as such, various forms of content analysis can be performed. As one example, the content descriptors can describe semantic structures of the image.

In some implementations, similar to the computation of image statistics, the computing system can leverage one or more machine-learned models such as, for example, convolutional neural networks, to generate the content information. In particular, in some implementations, the computing system can use one or more convolutional neural networks to generate the content descriptors for the current image and/or the base image.

As one example, to determine the content descriptors for an image (e.g., a current image and/or a base image), the computing system can input the image into the convolutional neural network and, in response, receive an output from the convolutional neural network. In some implementations, the output of the convolutional neural network (e.g., data descriptive of detected objects or scene classifications) can be used as the content descriptors for the input image. In other implementations, one or more values obtained from hidden layers or neurons of the neural network (e.g., an "embedding") can be used as the content descriptors or as a basis for generating the content descriptors.

In some implementations, the convolutional neural network(s) used for generating the content descriptors can be same as those used for generating the image statistics. For example, the content descriptors can be generated from information extracted from a hidden layer of the network that is "deeper" or closer to the output layer of the network while the image statistics can be generated from information extracted from a hidden layer of the network that is "earlier" or closer to the input layer of the network. In such fashion, the content descriptors can include higher level abstract information (e.g., overarching content relationships, semantic structures, etc.) while the image statistics can include lower level abstract information (e.g., low level edge information, coloration information, etc.). In other implementations, the convolutional neural network(s) used for generating the content descriptors can be different networks from those used for generating the image statistics.

The convolutional neural network can be specifically trained to provide the one or more content descriptors. Alternatively, the convolutional neural network can be a general network pre-trained to perform some generic form of image analysis (e.g., image classification, image recognition, object recognition, object segmentation, etc.). Example convolutional neural networks include the VGG16, VGG19, ResNet50, Inception V3, and Xception networks.

At each iteration, the computing system can determine a content loss value that describes a difference between the one or more current content descriptors determined for the current image and the one or more base content descriptors determined for the base image. In particular, use of a content loss in addition to the style loss enables style transfer to be performed in a content-preserving way. That is, the transfer of style via optimization of the style loss can be balanced against the preservation of content via optimization of the content loss. To continue the example provided above, the texture map for the model of the zebra can be updated to receive a style transfer, however, it can retain content-descriptive features such as, for example, stripes within the style-transferred texture.

At each iteration, the computing system can modify the current attribute rendering map based at least in part on a gradient of the loss function. For example, the gradient of the loss function can be the gradient with respect to the current image.

According to another aspect of the present disclosure, in some implementations, the gradient of the loss function can be backpropagated through the rendering operation to modify the attribute rendering map itself. For example, this can be achieved by storing UV-coordinates for each pixel during rendering and then routing the pixel gradients to the contributing parameters of the attribute rendering map. In some implementations, bilinear interpolation can be performed around each parameter to spread the gradient across neighboring parameters.

The synthesized attribute rendering map can be parameterized according to various parameter schemes and the computing system can modify the parameters of the attribute rendering map according to such parameter schemes. As one example, the attribute rendering map can be parameterized with an array of pixels. As another example, the attribute rendering map can be parameterized with some other decorrelated structure, such as, for example, a Laplacian pyramid (e.g., a weighted spectrum of Laplacian pyramid). Thus, as one example, modifying the current attribute rendering map can include directly modifying the attribute values (e.g., pixel values) of the attribute rendering map. As another example, modifying the current attribute rendering map can include modifying one or more decorrelated parameter structures of the attribute rendering map and then regenerating the attribute rendering map from the decorrelated structure after such modification(s).

In some implementations, in addition or alternatively to modification of the attribute rendering map at each iteration based on the gradient of the loss function, the computing system can modify one or more parameters of a map generation function configured to generate the current attribute rendering map or one or more parameters of a rendering function configured to render the current image. As examples, one or both of the map generation function and the rendering function can be or include a machine-learned neural network (e.g., convolutional neural network) or other learned function (e.g., a machine-learned linear model).

The computing system can end the iterative process when one or more criteria are met. Example criteria include: when the loss function converges; when a threshold number of iterations have been completed; when a moving average of a total loss value is less than a threshold amount; when an iteration-over-iteration change in the total loss value is less than a threshold amount; and/or other various criteria. Upon completion of the iterative process, the current attribute rendering map as of the final iteration can be stored as the final attribute rendering map for the three-dimensional model.

Thus, the systems and methods of the present disclosure provide the technical effect and benefit of enabling style transfer to be performed for three-dimensional models, which has not been achieved by existing techniques. This may be particularly beneficial, for instance, for generating new virtual reality environments and/or augmented reality environments. For instance, it may simplify the process by which texture or other rendering attributes can be added to three-dimensional models of virtual and/or augmented reality objects/environments. Indeed, it is possible to add globally consistent texture to a three dimensional model simply by providing the model and one or more reference images as inputs to the system.

As an additional example technical effect and benefit, the systems and methods of the present disclosure can provide more globally consistent style transfer results by computing the average of the image statistics over multiple viewpoints in rendered image space and then computing the style loss using the multi-viewpoint averaged image statistics. In particular, the systems and methods of the present disclosure can provide consistent attribute rendering maps for three-dimensional models that include non-uniform and/or fragmented UV-mapping and/or locations that are visible only in a limited number of viewpoints.

Improved global consistency in attribute rendering may, for instance, mean that the texture applied to the three dimensional model may include fewer "seams" and/or inconsistent patches. In a virtual reality implementation, this may result in a three-dimensional object which has a consistent, seamless texture regardless of the viewpoint from which it is observed. In certain scenarios, such objects may, as a consequence, appear more realistic.

In addition, by computing the style loss using the multi-viewpoint averaged image statistics, instead of treating each viewpoint independently, the loss may converge more quickly. It may also make the approach described herein more suitable for performance using a single GPU (for example, since the optimization problem can be computed iteratively).

Furthermore, many potential applications can be improved or enhanced through the use of style transfer to a three-dimensional model as described herein. Such applications may include, for instance, generation of virtual and/or augmented reality environments and/or objects, generation of simulated environments, generation of video game scenes, animated moving picture scenes, or the like, and/or other applications which include renderings of three-dimensional models.

With reference now to the Figures, example embodiments of the present disclosure will be discussed in further detail.

Example Devices and Systems

FIG. 1A depicts a block diagram of an example computing system 100 that performs style transfer for three-dimensional models according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device (e.g., augmented and/or virtual reality headset), an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more style transfer managers 120. The style transfer manager 120 can perform style transfer for three-dimensional models according to example embodiments of the present disclosure. For example, the style transfer manager 120 can perform some or all of method 600 of FIGS. 6A-B and/or any other techniques described herein to perform style transfer. Example style transfer managers 120 are discussed with reference to FIGS. 2-4.

In some implementations, the style transfer managers 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, or other forms of neural networks.

In some implementations, the one or more style transfer managers 120 can be received from the server computing system 130 over network 180, stored in the user computing device memory 114, and then used or otherwise implemented by the one or more processors 112. In some implementations, the user computing device 102 can implement multiple parallel instances of a single style transfer manager 120 (e.g., to perform parallel style transfer across multiple instances of three-dimensional models).

Additionally or alternatively, one or more style transfer managers 140 can be included in or otherwise stored and implemented by the server computing system 130 that communicates with the user computing device 102 according to a client-server relationship. For example, the style transfer managers 140 can be implemented by the server computing system 140 as a portion of a web service (e.g., a style transfer service). Thus, one or more managers 120 can be stored and implemented at the user computing device 102 and/or one or more managers 140 can be stored and implemented at the server computing system 130. The managers 140 can be the same as the managers 120 described above.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more style transfer managers 140. For example, the managers 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example managers 140 are discussed with reference to FIGS. 2-4.

The user computing device 102 and/or the server computing system 130 can train the machine-learned models (e.g., neural networks) included in the managers 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models included in the managers 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train models included in the style transfer managers 120 and/or 140 based on a set of training data 142. In some implementations, the training data 142 can include, for example, sets of images labelled with ground-truth image statistics and/or ground-truth content descriptors. In other implementations, the training data 142 can include, for example, sets of images labelled with various other information such as, for example, ground-truth image classifications, ground-truth object labels, ground-truth object segmentations, etc.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the machine-learned models included in the managers 120 can be both trained and used locally at the user computing device 102. In some of such implementations, the user computing device 102 can implement the model trainer 160 to personalize the machine-learned models included in the managers 120 and/or 140 based on user-specific data.

Figure 1B:
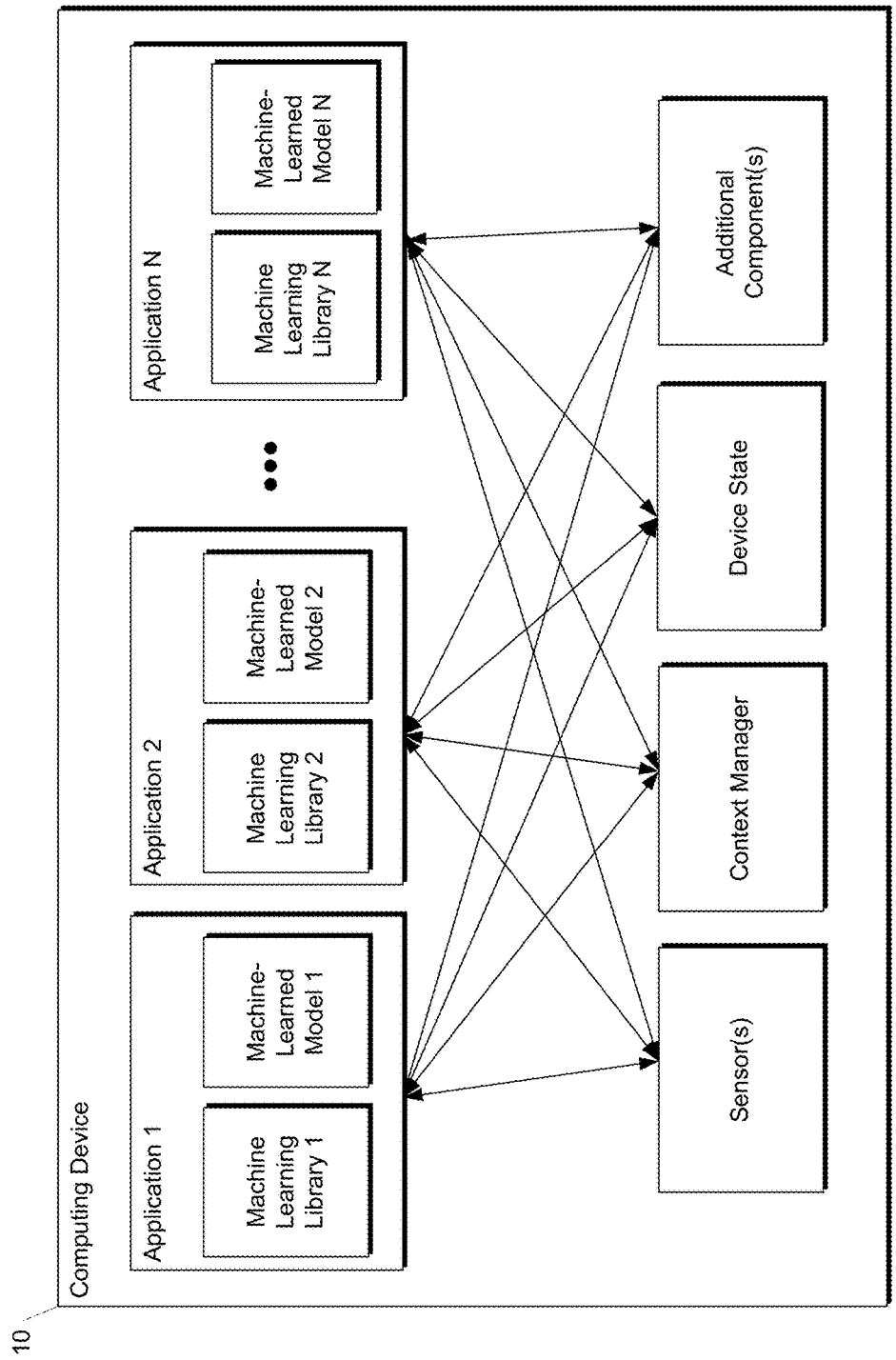
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application can include its own style transfer manager. Each application contains its own machine learning library and machine-learned model(s). For example, each application can include a machine-learned model. Example applications include a virtual reality application, a gaming application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
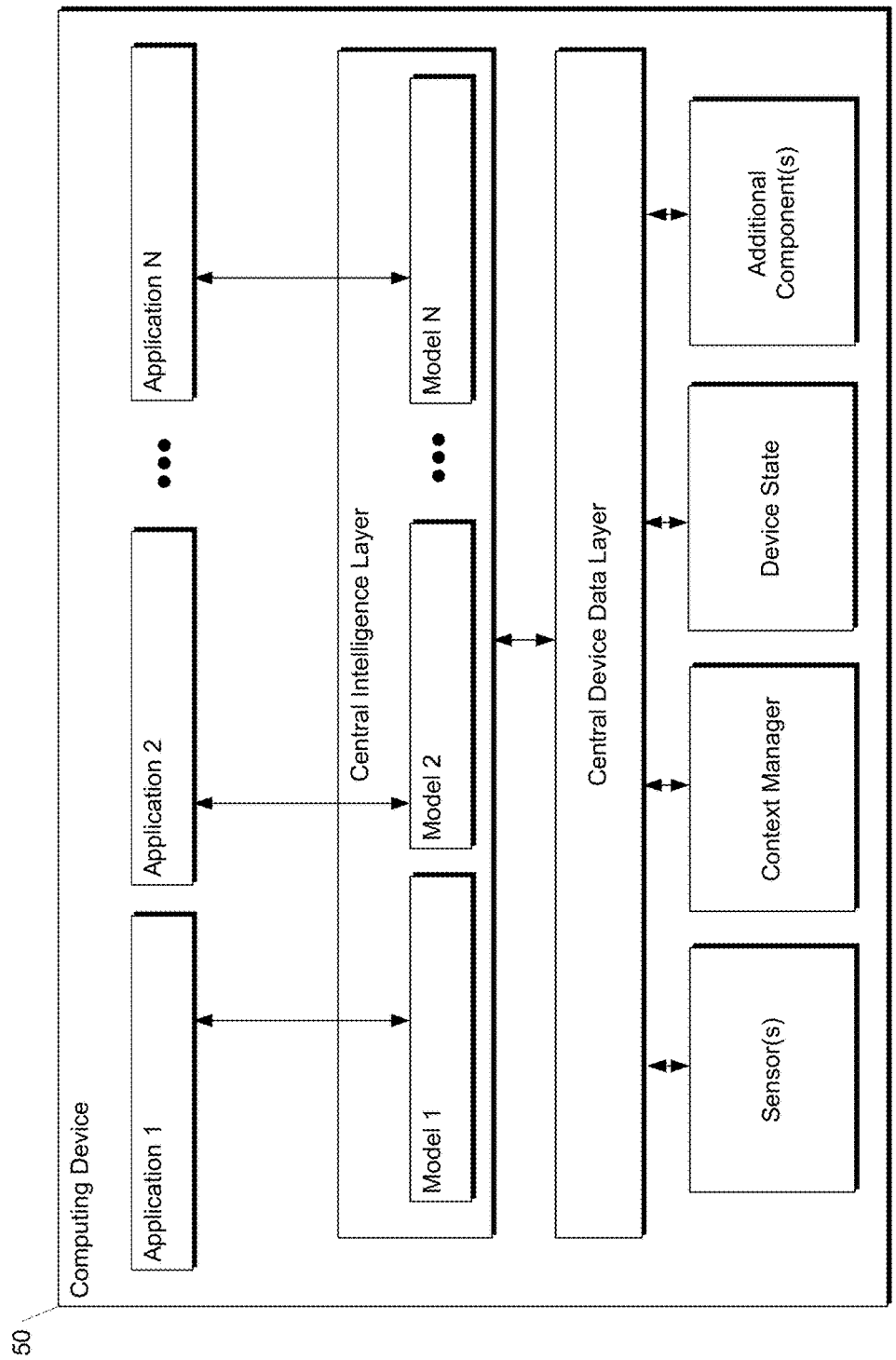
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a virtual reality application, a gaming application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50. The central intelligence layer can employ the models to implement a style transfer manager.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Style Transfer Managers

FIG. 2 depicts a block diagram of an example style transfer manager 200 according to example embodiments of the present disclosure. The style transfer manager 200 can receive as input one or more reference images 202 and data descriptive of a three-dimensional model 204. The style transfer manager 200 can output an attribute rendering map 206 for the three-dimensional model 204. In particular, the attribute rendering map 206 can exhibit a same style as is exhibited by the one or more reference images 202.

In some implementations, the style transfer manager 200 can iteratively update the attribute rendering map 206. For example, this is illustrated by the dashed arrow in FIG. 2.

FIG. 3 depicts a block diagram of an example style transfer manager 300 according to example embodiments of the present disclosure. The style transfer manager can include a rendering engine 308. The rendering engine 308 can be any device, component, application, or other system that renders images of three-dimensional models. As one example, the rendering engine 308 can implement the Open Graphics Library (OpenGL) to render images of the three-dimension models. As another example, the rendering engine 308 can be implemented by one or more graphics processing units (GPUs) or other processing devices.

The style transfer manager 300 can also include a viewpoint selector 310. The viewpoint selector 310 can select a viewpoint 312 and provide the viewpoint 312 to the rendering engine 308. As one example, at each iteration, the viewpoint selector 310 can sample a different viewpoint of the model 204. For example, the viewpoint selector 310 can select (for instance, randomly) a viewpoint from a set of expected viewpoints. The set of expected viewpoints can include all available viewpoints or can be limited to viewpoints from which the model is capable of being rendered or otherwise expected to be rendered during use of the model.

The rendering engine 308 can render a current image 313 of the three-dimensional model 204 using the current attribute rendering map 306.

The style transfer manager 300 can include an image statistics generator 314. The image statistics generator 314 can include any device, component, application, or other system that generates image statistics descriptive of a style of an input image.

In one example, the image statistics generator 314 can be or include a neural network such as, for example, a convolutional neural network. Thus, as one example, to determine the image statistics for an image (e.g., the current image 313 and/or the reference image(s) 202), the style transfer manager 300 can input the image into the convolutional neural network and, in response, receive an output from the convolutional neural network. In some implementations, the output of the convolutional neural network can be used as the image statistics for the input image. In other implementations, one or more values obtained from hidden layers or neurons of the neural network (e.g., an "embedding") can be used as the image statistics or as a basis for generating the image statistics. As one example, the style transfer manager 300 can determine the one or more image statistics for the input image based at least in part on one or more Gram or covariance matrices computed over internal features (e.g., hidden neurons) of the convolutional neural network.

The convolutional neural network can be specifically trained to provide the one or more image statistics. Alternatively, the convolutional neural network can be a general network pre-trained to perform some generic form of image analysis (e.g., image classification, image recognition, object recognition, object segmentation, etc.). Example convolutional neural networks include the VGG16, VGG19, ResNet50, Inception V3, and Xception networks.

Further, the image statistics generator 314 can leverage other machine-learned models or networks in addition or alternatively to convolutional neural networks to generate the image statistics. Example neural networks (e.g., deep neural networks) include feed-forward neural networks, recurrent neural networks, etc. Additional example models that can be used to generate the image statistics include linear models; principal component analysis models; clustering models (e.g., K-nearest-neighbor); probabilistic models; Markov random fields; regression models; etc.

The image statistics generator 314 can generate one or more reference image statistics 316 for the one or more reference images 202. In some implementations, this is done once prior to performance for a plurality of iterations. As one example, the one or more image statistics can include histograms (e.g., color histograms); edge information; contrast; spatial frequency (e.g., high-frequency maps); average pixel values; maximum/minimum pixel values; median values and/or variance of individual feature channels; feature matching; Markovian texture analysis; Markov Random Fields; etc.

The image statistics generator 314 can also generate one or more current image statistics 318 for the current image 313. In some implementations, this is done at each of a plurality of iterations. As one example, the one or more image statistics can include histograms (e.g., color histograms); edge information; contrast; spatial frequency (e.g., high-frequency maps); average pixel values; maximum/minimum pixel values; median values and/or variance of individual feature channels; feature matching; Markovian texture analysis; Markov Random Fields; etc.

Thus, the image statistics generator 314 can generate, optionally prior to beginning the iterative process, one or more reference image statistics 316 for the reference image (s) 202. Then, at each iteration, the rendering engine 308 can render the current image 313 of the model 204 from a different viewpoint 312 and the image statistics generator 314 can generate one or more current image statistics 318 for the current image 313.

At each iteration, the style transfer manager 300 can evaluate a style loss function 320 that provides a style loss value 322 based at least in part on the one or more reference image statistics 316 determined for the reference image(s) 202 and the one or more current image statistics 318 determined for the current image 313. As one example, the style loss value 322 can be a mean squared error between the one or more reference image statistics 316 determined for the reference image(s) 202 and a multi-viewpoint average of the current image statistics 318 averaged over the plurality of iterations (e.g., all of the iterations or a moving window of the iterations). As another example, the style loss value 322 can be a mean squared error between the one or more reference image statistics 316 determined for the reference image(s) 202 and a the current image statistics 318.

Thus, the style loss value 322 indicates, at each iteration, how similar the style of the current image 313 is to the style exhibited by the reference image(s) 202. As will be described further below, the style transfer manager 300 can update the current attribute rendering map 306 at each iteration based at least in part on the style loss value 322 (e.g., to reduce the style loss value 322 such that the renderings of the model 204 become more similar to the style exhibited by the reference image(s) 202).

A style loss function 320 can provide a style loss 322 based at least in part on the one or more reference image statistics 316 and the one or more current image statistics 318. According to yet another aspect of the present disclosure, in some implementations, the computation of the style loss can be performed using multi-viewpoint averaged image statistics, instead of treating each viewpoint independently. For example, at each iteration, a running average of image statistics across multiple viewpoint renderings can be updated with the current image statistics determined for the current image. The loss function can provide the style loss value based on a difference between the average image statistics and the reference image statistics determined for the reference image(s).

As is described further elsewhere herein, the style transfer manager 300 can modify the current attribute rendering map 306 based at least in part on the style loss. As one example, at each of a plurality of iterations, the style transfer manager 300 can backpropagate a gradient of the style loss 322 (e.g., with respect to the current image 313) back through the image statistics generator 314 (e.g., without modifying the image statistics generator 314); through the current image 313; and then through the rendering operation performed by the rendering engine 308 to reach the current attribute rendering map 306. The style transfer manager 300 can modify one or more parameters of the current attribute rendering map 306 based on the backpropagated gradient (e.g., to reduce the style loss 322).

Figure 4:
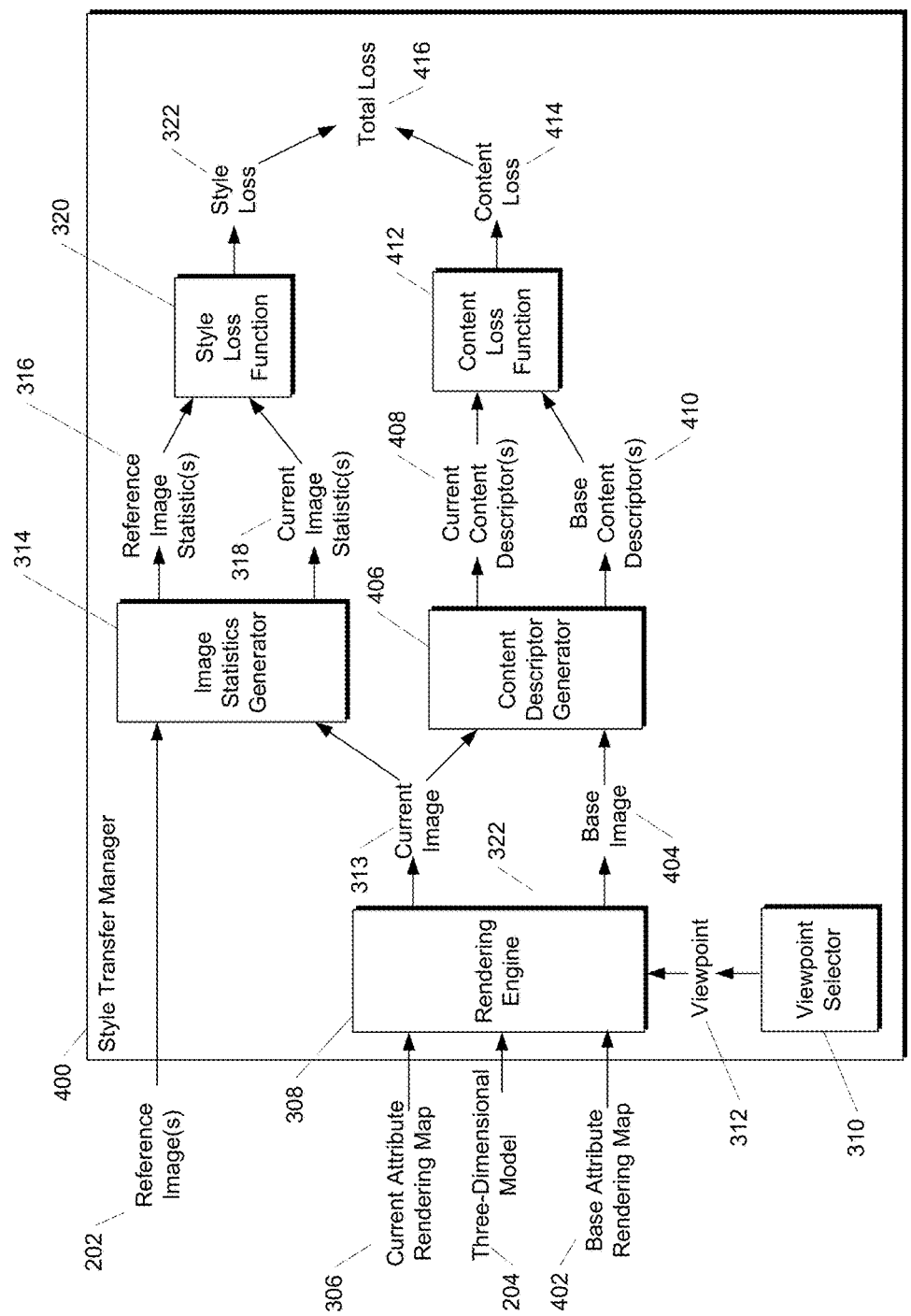
FIG. 4 depicts a block diagram of an example style transfer manager according to example embodiments of the present disclosure.

FIG. 4 depicts a block diagram of an example style transfer manager 400 according to example embodiments of the present disclosure. The style transfer manager 400 is similar to the style transfer manager 300 of FIG. 3, but further computes a content loss 414 at each iteration.

In particular, the style transfer manager 400 can include the rendering engine 308, similar to manager 300 of FIG. 3. However, as illustrated in FIG. 4, the rendering engine 308 can further render a base image 404 of the three-dimensional model 204 from the viewpoint 312 using a base attribute rendering map 402. The base attribute rendering map 402 can be an attribute rendering map associated with an original or base version of the model 204. As one example, the base attribute rendering map 402 can be a base texture map.

The base attribute rendering map 402 can include attribute values that assist in conveying content information. To provide one particular example, a model of a zebra might have a base texture map that includes texture values that contribute to renderings of the model being recognizable as a zebra. For example, the texture map might provide textures that include stripes.

The style transfer manager 400 can also further include a content descriptor generator 406. The content descriptor generator 406 can include any device, component, application, or other system that generates content descriptors descriptive of the content of an input image. The content descriptors for each image can include any information that describes the content of the image and, as such, various forms of content analysis can be performed. As one example, the content descriptors can describe semantic structures of the image.

In one example, the content descriptor generator 406 can be a neural network such as, for example, a convolutional neural network. Thus, in some implementations, similar to the computation of image statistics, the content descriptor generator 406 can leverage one or more machine-learned models such as, for example, convolutional neural networks, to generate the content information. In particular, in some implementations, the content descriptor generator 406 can use one or more convolutional neural networks to generate the content descriptors for the current image and/or the base image.

As one example, to determine the content descriptors for an image (e.g., the current image 313 and/or the base image 404), the content descriptor generator 406 can input the image into the convolutional neural network and, in response, receive an output from the convolutional neural network. In some implementations, the output of the convolutional neural network (e.g., data descriptive of detected objects or scene classifications) can be used as the content descriptors for the input image. In other implementations, one or more values obtained from hidden layers or neurons of the neural network (e.g., an "embedding") can be used as the content descriptors or as a basis for generating the content descriptors.

In some implementations, the convolutional neural network(s) used for generating the content descriptors can be same as those used for generating the image statistics. For example, the content descriptors can be generated from information extracted from a hidden layer of the network that is "deeper" or closer to the output layer of the network while the image statistics can be generated from information extracted from a hidden layer of the network that is "earlier" or closer to the input layer of the network. In such fashion, the content descriptors can include higher level abstract information (e.g., overarching content relationships, semantic structures, etc.) while the image statistics can include lower level abstract information (e.g., low level edge information, coloration information, etc.). In other implementations, the convolutional neural network(s) used for generating the content descriptors can be different networks from those used for generating the image statistics.

The convolutional neural network can be specifically trained to provide the one or more content descriptors. Alternatively, the convolutional neural network can be a general network pre-trained to perform some generic form of image analysis (e.g., image classification, image recognition, object recognition, object segmentation, etc.).

Example convolutional neural networks include the VGG16, VGG19, ResNet50, Inception V3, and Xception networks.

The content descriptor generator 406 can generate one or more current content descriptors 408 based on the current image 313. The content descriptor generator 406 can generate one or more base content descriptors 410 for the base image 404. This can be performed at each of a plurality of iterations.

A content loss function 412 can provide a content loss 414 based at least in part on the one or more current content descriptors 408 and the one or more base content descriptors 410. For example, the content loss 414 can be a mean squared error between the current content descriptor(s) 408 and the base content descriptor(s) 410.

A total loss 416 can be determined based on the style loss 322 and the content loss 414. For example, the total loss 416 can be a sum (e.g., a weighted sum) of the style loss 322 and the content loss 414.

Thus, at each iteration, the style transfer manager 400 can determine a content loss value 414 that describes a difference between the one or more current content descriptors 408 determined for the current image 313 and the one or more base content descriptors determined for the base image. In particular, use of a content loss in addition to the style loss enables style transfer to be performed in a content-preserving way. That is, the transfer of style via optimization of the style loss can be balanced against the preservation of content via optimization of the content loss. To continue the example provided above, the texture map for the model of the zebra can be updated to receive a style transfer, however, it can retain content-descriptive features such as, for example, stripes within the style-transferred texture.

Figure 5:
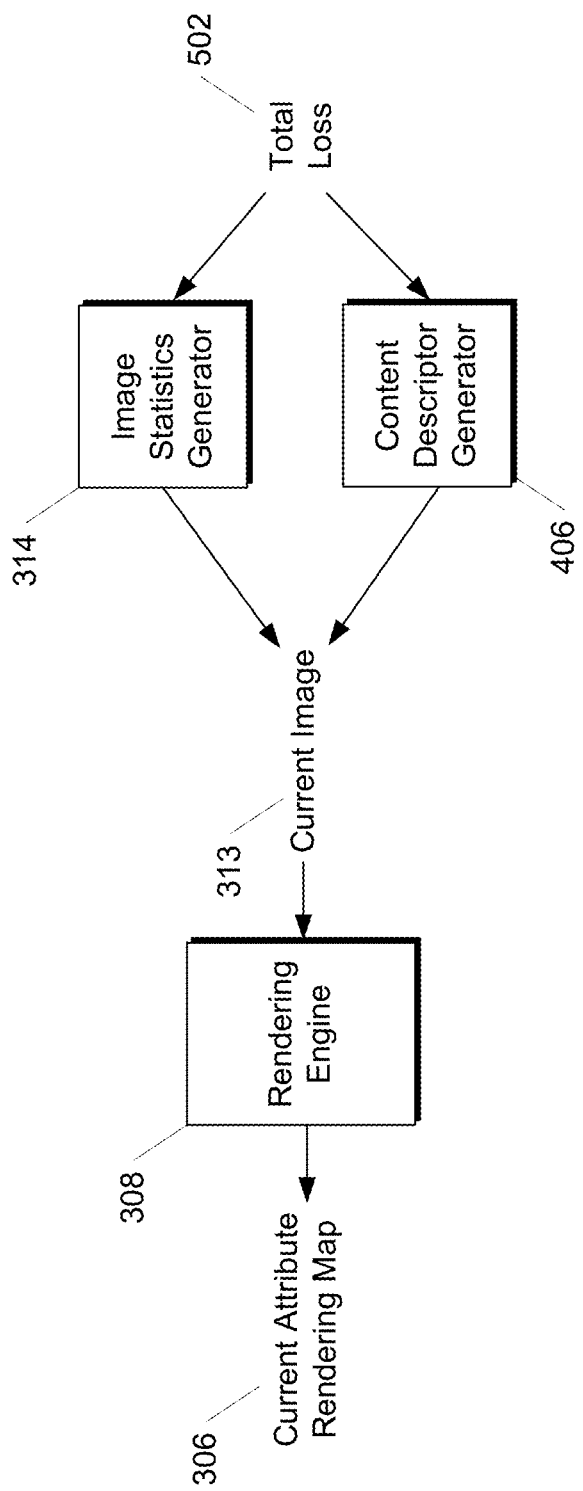
FIG. 5 depicts a block diagram of an example workflow to modify an attribute rendering map according to example embodiments of the present disclosure.

FIG. 5 depicts a block diagram of an example workflow to modify the current attribute rendering map 306 according to example embodiments of the present disclosure. A gradient of the total loss 502 (e.g., with respect to the current image 313) can be backpropagated through the image statistics generator 314 (e.g., without modifying the image statistics generator 314) and also through the content descriptor generator 406 (e.g., without modifying the image statistics generator 406).

Next, the gradient can be backpropagated through the current image 313 and then through the rendering operation performed by the rendering engine 308 to render the current image 313 to reach the current attribute rendering map 306. In some implementations, the gradient can be backpropagated through the rendering operation to modify the attribute rendering map 306 itself. For example, this can be achieved by storing UV-coordinates for each pixel during rendering and then routing the pixel gradients to the contributing parameters of the attribute rendering map 306. In some implementations, bilinear interpolation can be performed around each parameter to spread the gradient across neighboring parameters.

One or more parameters of the current attribute rendering map 306 can be modified based on the backpropagated gradient (e.g., so as to reduce the total loss 502). The synthesized attribute rendering map 306 can be parameterized according to various parameter schemes and the computing system can modify the parameters of the attribute rendering map 306 according to such parameter schemes. As one example, the attribute rendering map 306 can be parameterized with an array of pixels. As another example, the attribute rendering map 306 can be parameterized with some other decorrelated structure, such as, for example, a Laplacian pyramid (e.g., a weighted spectrum of Laplacian pyramid). Thus, as one example, modifying the current attribute rendering map 306 can include directly modifying the attribute values (e.g., pixel values) of the attribute rendering map 306. As another example, modifying the current attribute rendering map 306 can include modifying one or more decorrelated parameter structures of the attribute rendering map 306 and then regenerating the attribute rendering map 306 from the decorrelated structure after such modification(s).

In some implementations, in addition or alternatively to modification of the attribute rendering map 306 at each iteration based on the gradient of the loss 502, the computing system can modify one or more parameters of a map generation function configured to generate the current attribute rendering map 306 or one or more parameters of a rendering function (e.g., the rendering engine 308) configured to render the current image. As examples, one or both of the map generation function and the rendering function can be or include a machine-learned neural network (e.g., convolutional neural network) or other learned function (e.g., a machine-learned linear model).

Example Methods

Figure 6A:
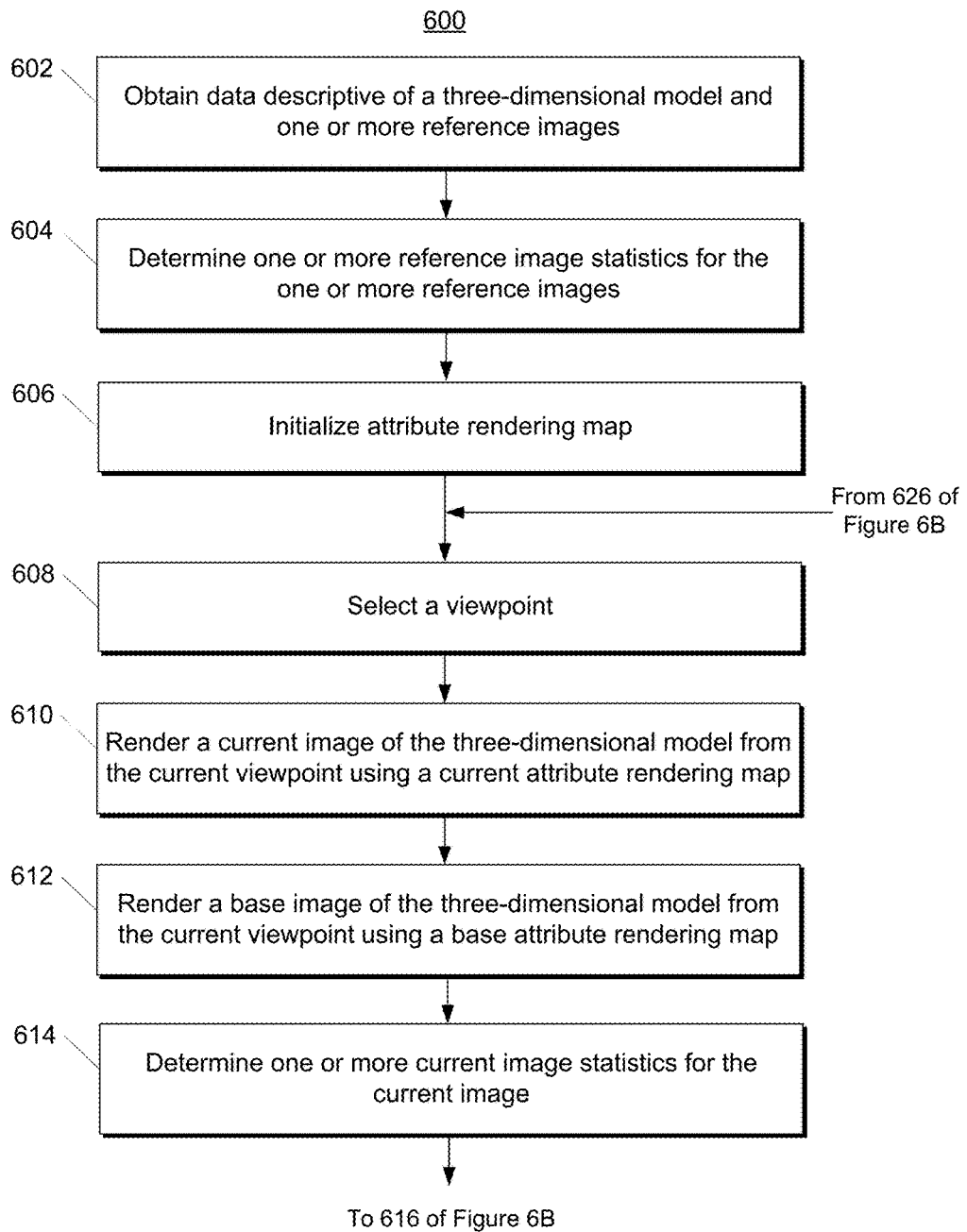
FIGS. 6A and 6B depict a flow chart diagram of an example method to perform style transfer for three-dimensional models according to example embodiments of the present disclosure.
Figure 6B:
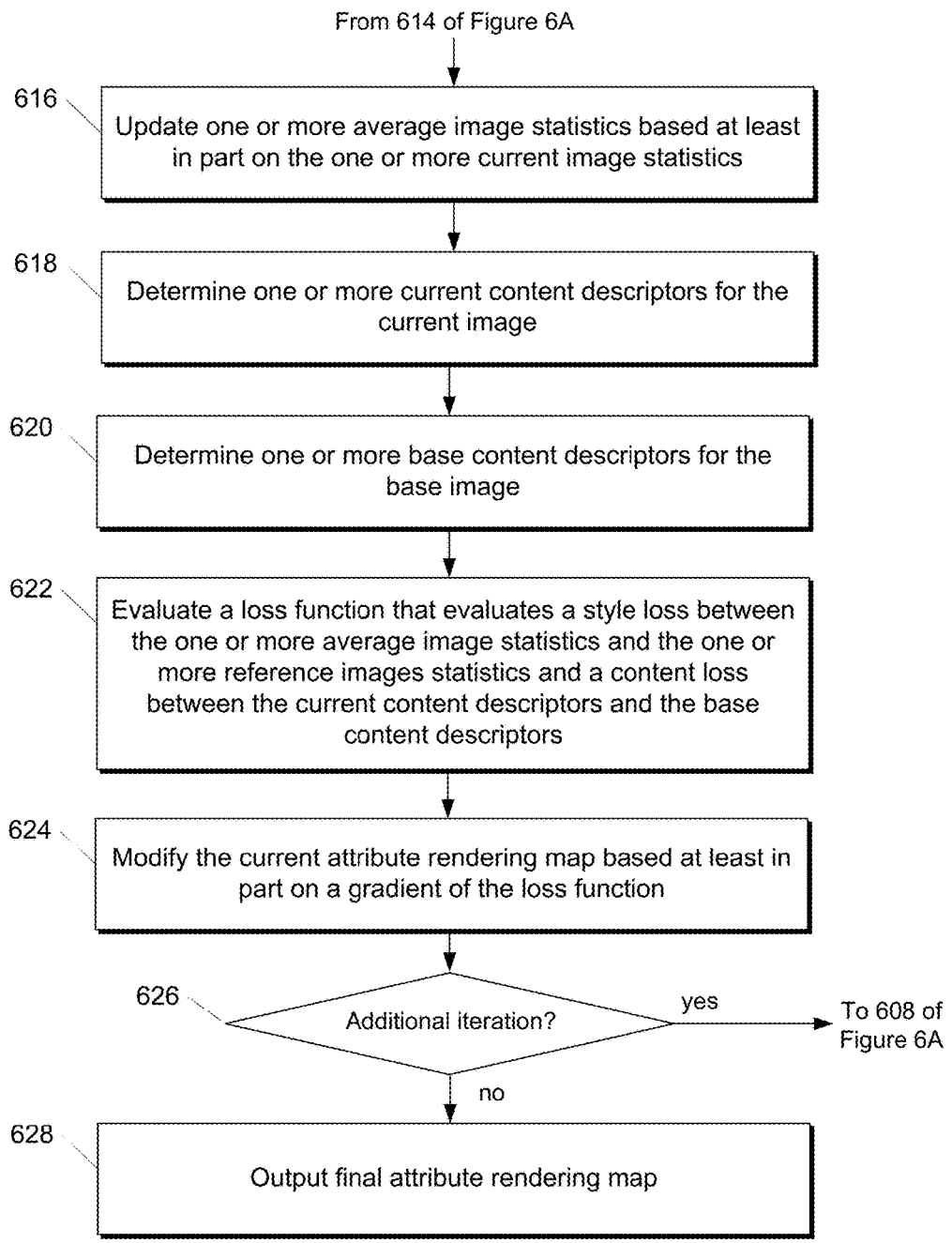

FIGS. 6A and 6B depict a flow chart diagram of an example method to perform style transfer for three-dimensional models according to example embodiments of the present disclosure. Although FIGS. 6A-B depict steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

Referring first to FIG. 6A, at 602, a computing system can obtain one or more reference images and data descriptive of a three-dimensional model. At 604, the computing system can determine one or more reference image statistics for the one or more reference images.

At 606, the computing system can initialize an attribute rendering map. At 608, the computing system can select a viewpoint.

At 610, the computing system can render a current image of the three-dimensional model from the current viewpoint using the current attribute rendering map. At 612, the computing system can render a base image of the three-dimensional model from the current viewpoint using a base attribute rendering map.

At 614, the computing system can determine one or more current image statistics for the current image. After 614, method 600 can proceed to 616 of FIG. 6B.

Referring now to FIG. 6B, at 616, the computing system can update one or more average image statistics based at least in part on the one or more current image statistics.

At 618, the computing system can determine one or more current content descriptors for the current image. At 620, the computing system can determine one or more base content descriptors for the base image.

At 622, the computing system can evaluate a loss function that evaluates a style loss between the one or more average image statistics and the one or more reference image statistics and a content loss between the current content descriptors and the base content descriptors. At 624, the computing system can modify the current attribute rendering map based at least in part on a gradient of the loss function.

At 626, the computing system can determine whether to perform an additional iteration. If the computing system determines at 626 to perform an additional iteration, then method 600 can return to 608 of FIG. 6A and select a new viewpoint.

However, referring still to FIG. 6B, if the computing system determines at 626 that no additional iterations should be performed, then method 600 can proceed to 628. The computing system can end the iterative process when one or more criteria are met. Example criteria include: when the loss function converges; when a threshold number of iterations have been completed; when a moving average of a total loss value is less than a threshold amount; when an iteration-over-iteration change in the total loss value is less than a threshold amount; and/or other various criteria.

At 628, the computing system can output the final attribute rendering map. For example, upon completion of the iterative process, the current attribute rendering map as of the final iteration can be stored at 628 as the final attribute rendering map for the three-dimensional model.

Example Visualizations

Figure 7B:
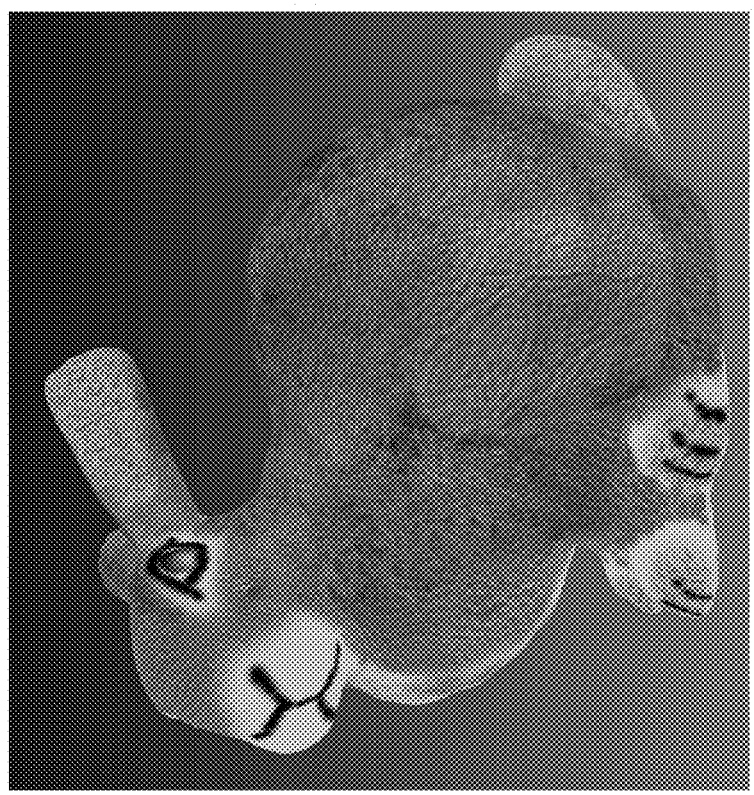
FIG. 7B depicts an example rendering of an example three-dimensional model rendered using the example base texture map of FIG. 7A according to example embodiments of the present disclosure.
Figure 7A:
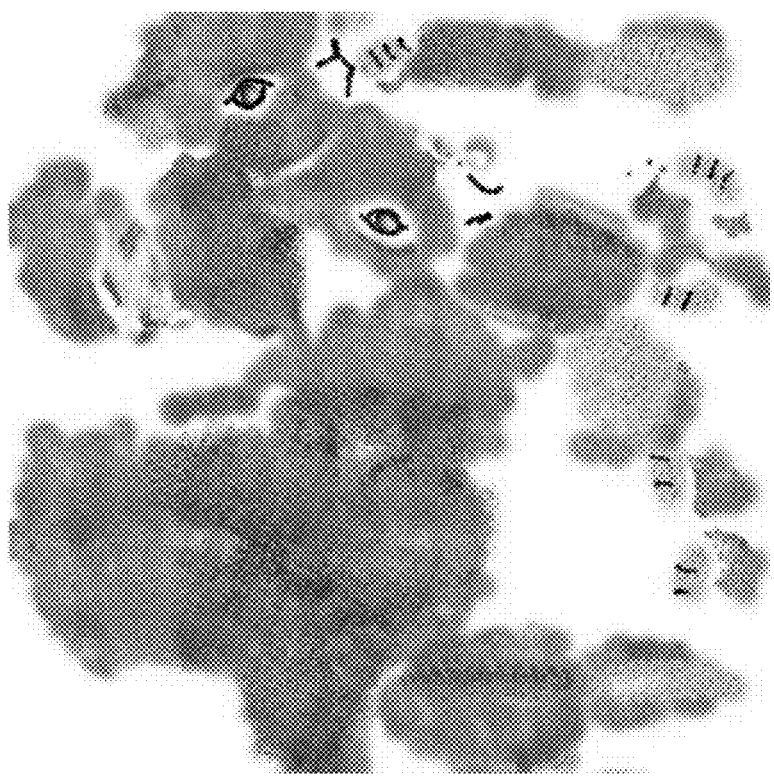
FIG. 7A depicts an example base texture map according to example embodiments of the present disclosure.

FIG. 7A depicts an example base texture map according to example embodiments of the present disclosure. In particular, the example base texture map provides a base texture for a three-dimensional model of a rabbit. FIG. 7B depicts an example rendering of the three-dimensional model of the rabbit rendered using the base texture map of FIG. 7A according to example embodiments of the present disclosure.

Figure 7D:
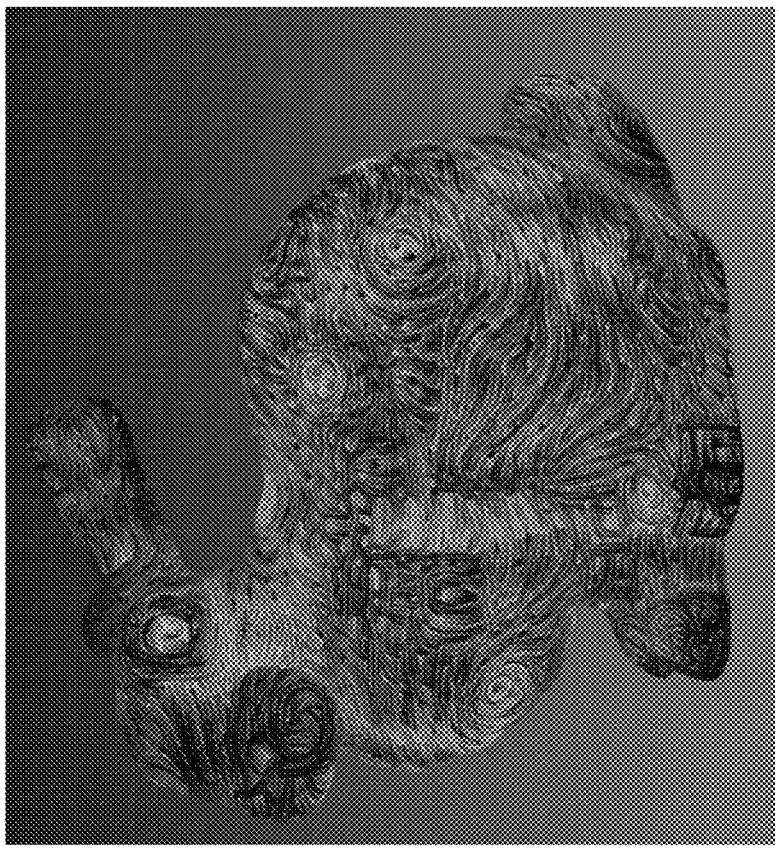
FIG. 7D depicts an example rendering of an example three-dimensional model rendered using the example synthesized texture map of FIG. 7C according to example embodiments of the present disclosure.
Figure 7C:
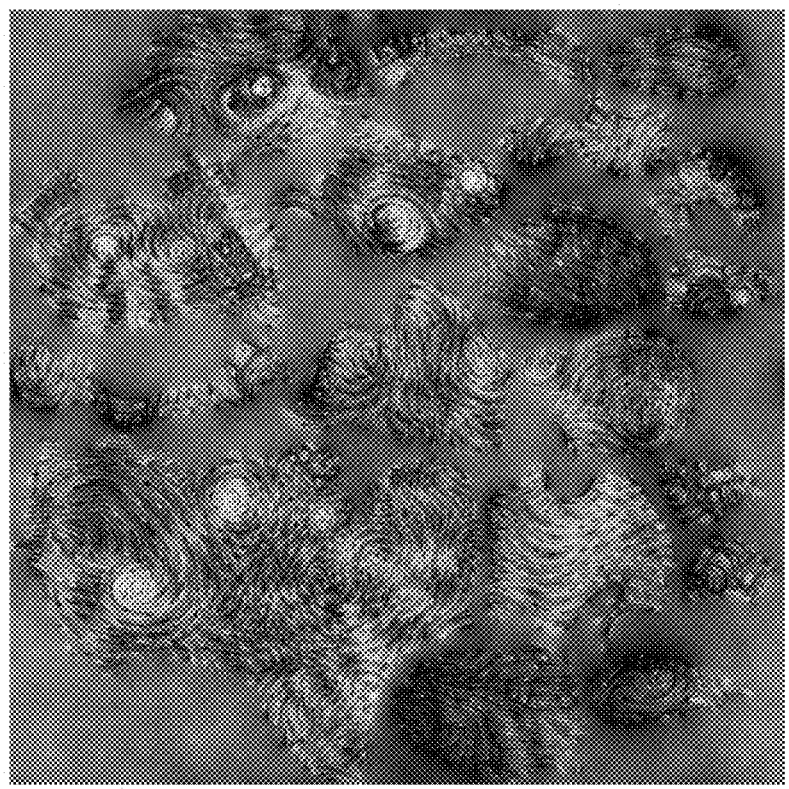
FIG. 7C depicts an example synthesized texture map according to example embodiments of the present disclosure.

FIG. 7C depicts an example synthesized texture map according to example embodiments of the present disclosure. In particular, the synthesized texture map of FIG. 7C has been synthesized for the three-dimensional model of the rabbit according to the techniques of the present disclosure and through use of Vincent Van Gogh's famous painting "The Starry Night" as a reference image. Thus, the style of "The Starry Night" has been transferred to the synthesized texture map of FIG. 7C according to the techniques described herein.

FIG. 7D depicts an example rendering of the three-dimensional model of the rabbit rendered using the example synthesized texture map of FIG. 7C according to example embodiments of the present disclosure. As illustrated in the example rendering of FIG. 7D, the synthesized texture map mimics the style of the reference image, but also retains content-descriptive information, such as, for example, texture that indicates the presence of an eye on the head of the rabbit.

Although a single example rendering of the three-dimensional model is provided in FIG. 7D, it should be recognized that the synthesized texture map of FIG. 7C can be used to render the three-dimensional model from any viewpoint and that such rendering will include the transferred style. That is, aspects of the present disclosure can be performed to generate a synthesized texture map which is then usable to generate renderings from any desired viewpoint, which is in contrast to techniques which simply transfer the style of a reference image to a single rendering of a three-dimensional model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
    obtaining, by one or more computing devices, one or more references images and data descriptive of a three-dimensional model;
    determining, by the one or more computing devices, one or more reference image statistics for the one or more reference images; and
    for each of a plurality of iterations:
        rendering, by the one or more computing devices, a current image of the three-dimensional model from a current viewpoint using a current attribute rendering map, wherein the current attribute rendering map provides a plurality of attribute values respectively for a plurality of locations of the three-dimensional model;
        determining, by the one or more computing devices, one or more current image statistics for the current image of the three-dimensional model rendered from the current viewpoint using the current attribute rendering map;
        updating, by the one or more computing devices, one or more average image statistics based at least in part on the one or more current image statistics determined for the current image;
        evaluating, by the one or more computing devices, a loss function that evaluates a difference between the one or more reference image statistics and the one or more average image statistics; and
        modifying, by the one or more computing devices, the current attribute rendering map based at least in part on a gradient of the loss function.

2. The computer-implemented method of claim 1, wherein the current attribute rendering map comprises a texture map.

3. The computer-implemented method of claim 1, wherein the current attribute rendering map comprises one or more of:
    a bump map;
    a light color map;
    a light position map; or
    a material property map.

4. The computer-implemented method of claim 1, further comprising, for each of the plurality of iterations and prior to said rendering, selecting, by the one or more computing devices, the current viewpoint for such iteration from a set of expected viewpoints.

5. The computer-implemented method of claim 1, wherein the one or more average image statistics that are updated are an average of the image statistics determined in one or more previous iterations.

6. The computer-implemented method of claim 1, comprising, after performance of a final iteration, storing or outputting the current attribute rendering map for use in rendering the three dimensional model.

7. The computer-implemented method of claim 1, wherein:
  determining, by the one or more computing devices, the one or more reference image statistics for the one or more reference images comprises:
    inputting, by the one or more computing devices, the one or more reference images into a convolutional neural network; and
    determining, by the one or more computing devices, the one or more reference image statistics based at least in part on one or more first Gram or covariance matrices computed over internal features of the convolutional neural network; and
  for each of the plurality of iterations, determining, by the one or more computing devices, the one or more current image statistics for the current image of the three-dimensional model comprises:
    inputting, by the one or more computing devices, the current image into the convolutional neural network; and
    determining, by the one or more computing devices, the one or more current image statistics based at least in part on one or more second Gram or covariance matrices computed over internal features of the convolutional neural network.

8. The computer-implemented method of claim 1, further comprising, for each of the plurality of iterations:
  rendering, by the one or more computing devices, a base image of the three-dimensional model from the current viewpoint using a base attribute rendering map;
  determining, by the one or more computing devices, one or more base content descriptors for the base image of the three-dimensional model rendered from the current viewpoint using the base attribute rendering map; and
  determining, by the one or more computing devices, one or more current content descriptors for the current image of the three-dimensional model rendered from the current viewpoint using the current attribute rendering map;
  wherein the loss function further evaluates a second difference between the one or more base content descriptors and the one or more current content descriptors.

9. The computer-implemented method of claim 8, wherein:
  determining, by the one or more computing devices, the one or more base content descriptors for the base image comprises:
    inputting, by the one or more computing devices, the base image into a convolutional neural network; and
    obtaining, by the one or more computing devices, a first embedding from a hidden layer of the convolutional neural network, the one or more base content descriptors comprising the first embedding; and
  determining, by the one or more computing devices, the one or more current content descriptors for the current image comprises:
    inputting, by the one or more computing devices, the current image into the convolutional neural network; and
    obtaining, by the one or more computing devices, a second embedding from the hidden layer of the convolutional neural network, the one or more current content descriptors comprising the second embedding.

10. The computer-implemented method of claim 1, wherein modifying, by the one or more computing devices, the current attribute rendering map based at least in part on the gradient of the loss function comprises backpropagating, by the one or more computing devices, the gradient of the loss function through a render operation performed by the one or more computing devices during said rendering of the current image.

11. The computer-implemented method of claim 1, wherein modifying, by the one or more computing devices, the current attribute rendering map based at least in part on the gradient of the loss function comprises modifying, by the one or more computing devices, one or more pixel values of the current attribute rendering map based at least in part on the gradient of the loss function.

12. The computer-implemented method of claim 1, wherein modifying, by the one or more computing devices, the current attribute rendering map based at least in part on the gradient of the loss function comprises modifying, by the one or more computing devices, a Laplacian pyramid of the current attribute rendering map based at least in part on the gradient of the loss function.

13. A computing system, comprising:
  one or more processors; and
  one or more non-transitory computer-readable media that collectively store instructions that when executed by the one or more processors cause the computing system to perform operations, the operations comprising:
    determining one or more reference image statistics for one or more reference images; and
    for each of a plurality of iterations:
      obtaining a current image of a three-dimensional model rendered from a current viewpoint using a current attribute rendering map;
      determining one or more current image statistics for the current image of the three-dimensional model rendered from the current viewpoint using the current attribute rendering map;
      evaluating a loss function that provides a loss value based at least in part on the one or more reference image statistics and based at least in part on the one or more current image statistics; and
      modifying, based at least in part on a gradient of the loss function, one or more of:
        the current attribute rendering map;
        one or more parameters of a map generation function configured to generate the current attribute rendering map; or
        one or more parameters of a rendering function configured to render the current image.

14. The computing system of claim 13, wherein the current attribute rendering map comprises a texture map.

15. The computing system of claim 13, wherein:
  the operations further comprise, for each of the plurality of iterations, updating one or more average image statistics based at least in part on the one or more current image statistics determined for the current image; and the loss function provides the loss value based at least in part on a difference between the one or more reference image statistics and the one or more average image statistics.

16. The computing system of claim 13, wherein:
determining the one or more reference image statistics for the one or more reference images comprises:
  inputting the one or more reference images into a convolutional neural network; and
  determining the one or more reference image statistics based at least in part on one or more first Gram or covariance matrices computed over internal features of the convolutional neural network; and
for each of the plurality of iterations, determining the one or more current image statistics for the current image of the three-dimensional model comprises:
  inputting the current image into the convolutional neural network; and
  determining the one or more current image statistics based at least in part on one or more second Gram or covariance matrices computed over internal features of the convolutional neural network.

17. The computing system of claim 13, wherein the operations further comprise, for each of the plurality of iterations:
  rendering a base image of the three-dimensional model from the current viewpoint using a base attribute rendering map;
  determining one or more base content descriptors for the base image of the three-dimensional model rendered from the current viewpoint using the base attribute rendering map; and
  determining one or more current content descriptors for the current image of the three-dimensional model rendered from the current viewpoint using the current attribute rendering map;
  wherein the loss function provides the loss value further based at least in part on a difference between the one or more base content descriptors and the one or more current content descriptors.

18. The computing system of claim 17, wherein:
determining the one or more base content descriptors for the base image comprises:
  inputting the base image into a convolutional neural network; and
  obtaining a first embedding from a hidden layer of the convolutional neural network, the one or more base content descriptors comprising the first embedding; and
determining the one or more current content descriptors for the current image comprises:
  inputting the current image into the convolutional neural network; and
  obtaining a second embedding from the hidden layer of the convolutional neural network, the one or more current content descriptors comprising the second embedding.

19. The computing system of claim 13, wherein the operation of modifying comprises backpropagating the gradient of the loss function through the rendering function performed by the computing system when rendering the current image.

20. One or more non-transitory computer-readable media that collectively store instructions that when executed by one or more processors cause the one or more processors to perform operations, the operations comprising:
determining one or more reference image statistics for one or more reference images; and
for each of a plurality of iterations:
  obtaining a current image of a three-dimensional model rendered from a current viewpoint using a current attribute rendering map;
  determining one or more current image statistics for the current image of the three-dimensional model rendered from the current viewpoint using the current attribute rendering map;
  evaluating a loss function that provides a loss value based at least in part on the one or more reference image statistics and based at least in part on the one or more current image statistics; and
  modifying, based at least in part on a gradient of the loss function, one or more of:
    the current attribute rendering map;
    one or more parameters of a map generation function configured to generate the current attribute rendering map; or
    one or more parameters of a rendering function configured to render the current image.

\* \* \* \* \*